Sept. 23, 1958

J. A. ISAACSON ET AL 2,852,959

CHANGE-SPEED TRANSMISSION HYDRAULIC SELECTOR VALVE

Filed Sept. 4, 1956

INVENTORS.
Jerrold A. Isaacson
Henry A. Ferguson
Paul O. Pippel
Atty.

United States Patent Office 2,852,959
Patented Sept. 23, 1958

2,852,959

CHANGE-SPEED TRANSMISSION HYDRAULIC SELECTOR VALVE

Jerrold A. Isaacson and Henry A. Ferguson, Lombard, Ill., assignors to International Harvester Company, a corporation of New Jersey Application September 4, 1956, Serial No. 607,649

12 Claims. (Cl. 74—754)

This invention relates to vehicle change-speed transmissions and to the control system therefor, and is more particularly directed to an hydraulic control valve which is selectively operable to aid in completing the various speed drives through such a transmission.

It is a general object of the present invention to provide transmission controls which include an improved hydraulic control valve shiftable to a plurality of at least five positions corresponding with the various power drives obtainable through the transmission.

Another object is to provide an improved control system for supplying fluid under pressure to fluid pressure actuated clutches which are operable in selected combinations for completing forward and reverse power trains through a tractor vehicle change-speed transmission.

A further primary object is to provide an hydraulic control system wherein a selector valve is fashioned with a simplified and novel arrangement of lands and grooves that permits employment of a minimum number of port openings therein.

A further object is to provide a plunger or spool-type hydraulic control valve having an improved arrangement for forming a plurality of longitudinally extending fluid-conducting passages in the piston or spool thereof.

A still further object is to provide a spool-type valve having a plurality of annular recesses formed in the bore and axially spaced therealong that cooperate with longitudinally extending passages formed in the spool thereof for directing fluid from a source under pressure selectively to a plurality of fluid pressure actuated friction-engaging means for completing power trains through a vehicle change-speed transmission.

A still further object is to provide a spool-type of minimum longitudinal and transverse dimensions and which, furthermore, is selectively positionable in any one of five different operating positions.

Another specific object is to provide a spool-type selector valve having an axially extending recess in the spool thereof that is fitted with a tightly fitting insert member fashioned to provide a pair of radially spaced and longitudinally extending fluid passages in said spool.

A further specific object is to provide a spool-type hydraulic valve in which the spool is selectively positionable in five different operating positions and wherein the amount of axial movement required for the spool between successive positions thereof, is identical.

A still further specific object is to provide a spool-type selector valve for a tractor vehicle change-speed transmission which is arranged so that the sequence of its operating positions corresponds with the operating sequence of the various speed drives through said transmission, i. e. from neutral through first, second and third speeds in consecutive order, and from neutral to reverse.

The present invention includes the novel constructions, arrangements and devices that will subsequently be described and claimed for accomplishing the above noted objects together with such other objects as will be apparent from the following description of a preferred embodiment of the invention, as illustrated, with reference to the accompanying drawings in which:

Figure 6 is a vertical sectional detail of one of the hydraulically actuated clutch mechanisms adaptable for use in the system;

Figure 7 is a vertical sectional detail of one of the hydraulically actuated brake mechanisms adaptable for use in the system; and Figure 8 is a vertical sectional view, taken on line 8—8 of Figure 1, showing generally the control valve piston or plunger and specifically depicting the construction of the passage forming insert incorporated therein.

The present invention envisages an application wherein a plurality of hydraulically actuated units are controlled and actuated selectively or, preferably, in various paired combinations in connection with the operation of a change-speed transmission in a vehicle. In order to depict one such preferred application the attached drawings illustrate the invention as incorporated in a generally conventional automotive vehicle power shifting transmission, although it is not specifically limited thereto, and the particular transmission selected for this purpose generally follows the construction of the transmission which is shown and described in the D. W. Kelbel U. S. Patents 2,605,652 and 2,693,711.

*Transmission*

Figure 1:
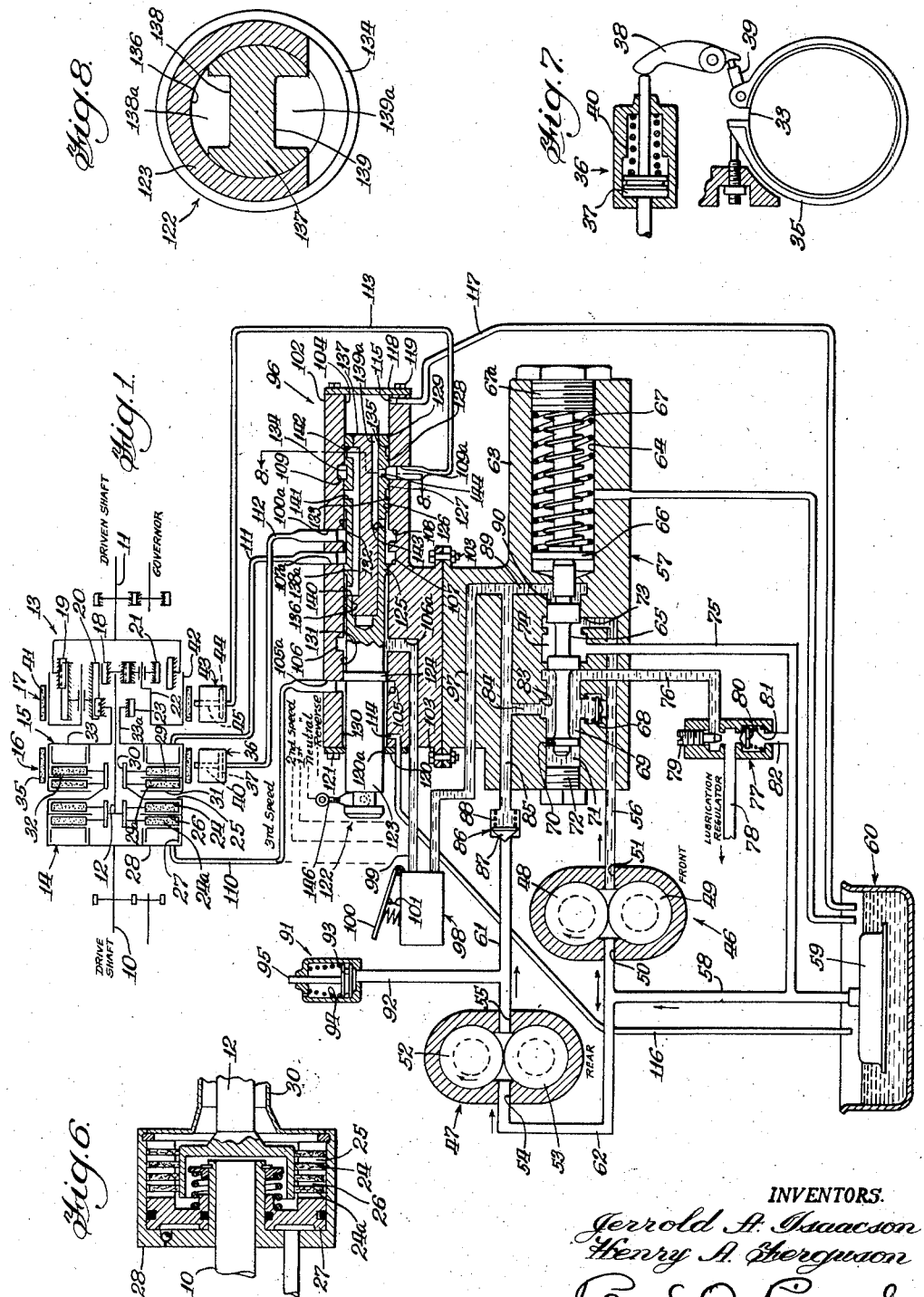
Figure 1 is a diagrammatic illustration of a vehicle transmission and the control system thereof, which system incorporates the control valve of the present invention, and wherein the transmission and control system are shown in a position corresponding with neutral drive through the transmission.

Referring now to the drawings, and particularly Figure 1 thereof, it will be noted that the conventional transmission selected for illustrating one preferred use of the invention has been shown diagrammatically so as to simplify the description of the well known structural features thereof. Such a transmission would include a drive shaft 10, a driven shaft 11, and an intermediate shaft 12 which may be suitably journalled with respect to the other shafts by conventional means (not shown), while all of said shafts are rotatably disposed in alignment with each other within a suitable housing or other enclosure (not shown). The drive shaft 10, of course, is intended for driving connection with the crank or output shaft of a suitable motive power, such as the internal combustion driving engine of a vehicle (neither of which are shown), while the driven shaft 11 is intended for driving connection with the traction or ground-engaging means of the vehicle. The transmission further includes therein a planetary gear set, indicated generally by the reference numeral 13, friction clutches 14 and 15 and the friction brakes 16 and 17, which clutches and brakes are actuatable for operating said planetary gear set. It will be appreciated, of course, that in a transmission of the character diagrammatically illustrated herein a torque converter is frequently incorporated in the drive between the drive shaft 10 and the first clutch 14, but, since such converter is not essential to the efficacy or operation of the present invention or to a clear understanding of the operation thereof, such converter mechanism has not been included, thus permitting considerable simplification of the drawings hereof.

The planetary gear set being generally conventional in its construction, and as illustrated at 13, is shown to include a sun gear 18 which is constrained for rotation with the intermediate shaft 12, a ring gear 19 which is drivingly connected to the driven shaft 11, an axially elongated planet gear 20 and a planet pinion gear 21 which orbit about the sun gear 18, a carrier 22 for the planet gears 20 and 21, and a second sun gear 23. The planet gears 20 and 21 are in mesh and the elongated planet gear 20 is also in mesh with the ring gear 19 and with the second sun gear 23, while the planet gear 21 is also in meshing engagement with the sun gear 18. Both of said sun gears are arranged to be driven from the drive shaft 10, the sun gear 18 being drivingly connected with said drive shaft via the shaft 12 and the clutch 14, while the sun gear 23 is connectable with the drive shaft 10 through said friction clutch 15.

Clutches

The friction clutch 14 may be any well known hydraulically actuated unit which is suitable for the purpose. As shown, diagrammatically in Figure 1 and in a fragmentary sectional view in Figure 6, the clutch illustrated is of a conventional construction and generally comprises friction discs such as indicated at 24 and 24a, the pressure plates shown at 25 and 26 and an actuating member, such as the piston or plunger indicated by the numeral 27. The discs 24—24a, which may be connected to the shaft 12 by suitable conventional means such as splining, are positioned for frictional compressing relation with the pressure plates 25 and 26 by action of the piston 27. The outer pressure plate 25 may be fashioned so as to form a part of a drum-like casing or housing 28 which, in turn, is drivingly connected with the drive shaft 10, while the other pressure plate 26 is also suitably connected to and fixed to rotate with the casing 28, and the piston 27 may be slidably positioned for operation in a suitable cavity-like area within said casing.

The second friction clutch, indicated at 15, preferably, is generally similar in construction to that of said first clutch 14 and, as illustrated, includes friction discs, such as shown at 29—29a which may be connected as by splining to an axially extending sleeve or quill-like extension 30 on the casing 28, and the pressure plates 31 and 32 which are constrained for rotation with a drum-like casing or housing 33 that, in turn, is affixed by a quill-like extension 33a to the sun gear 23, plus the piston or plunger 34 that is slidably positioned within the latter casing 33 and which latter piston is arranged for compressing the discs 29—29a into frictional engagement with the pressure plates 31 and 32 as well as with the piston itself.

Brakes

The hydraulically actuated brakes 16 and 17, which are shown diagrammatically in Figure 1 while brake 16 is further illustrated in a generally fragmentary sectional view in Figure 7, are of a conventional construction that is well known in the art. As applied to brake 16, it will be seen that it comprises a hoop-like brake band 35, suitably anchored at one end thereof, and which band is positioned to engage the outer or drum-like surface of the clutch casing 33 for purposes of braking the second sun gear 23 which, as previously mentioned, is connected by the quill 33a to said latter casing. The brake may be applied, as seen in Figure 7, by means of a fluid pressure device such as the hydraulic servo indicated at 36, which device includes a piston or plunger member 37 that acts through suitable linkage, such as the lever 38 and push rod 39, to tighten said band around the cooperating drum surface, while a spring 40 may be effective for yieldably holding the said piston in its brake disengaging position. Brake 17, which is substantially identical in construction with that of brake 16, includes a band 41 which engages the outer surface or drum-like portion 42 of the planet carrier 22 for braking said carrier, and is applied by means of a fluid pressure device, such as shown at 43, that includes a piston 44 that acts on said latter band through suitable linkage (not shown, but which may be similar to that of lever 38 and push rod 39 shown for brake 16), and a spring 45 which may be effective for yieldably holding the latter piston in its brake disengaging position.

Transmission drives

The transmission illustrated herein contemplates the provision of three forward speed drives, one reverse drive, and a neutral drive, between the drive shaft 10 and the driven shaft 11, and the following tabulation shows which of the clutches and brakes are engaged and disengaged in order to accomplish completion of each of these drives.

| Speeds | Clutches | | Brakes | |
|---|---|---|---|---|
| | #14 | #15 | #16 | #17 |
| Neutral | Off | Off | Off | Off |
| First | On | Off | Off | On |
| Second | On | Off | On | Off |
| Third | On | On | Off | Off |
| Reverse | Off | On | Off | On |

In the neutral position (see Figure 1) of the transmission, it will be noted, clutches 14 and 15 as well as the brakes 16 and 17 are disengaged. Under this condition the power train from the drive shaft 10 through the clutches and brakes, as well as through the intermediate shaft 12, is interrupted or open; thus no power is transmitted to either of the sun gears 18 or 23 and hence the remainder of the planetary gear set 13 remains idle and the driven shaft 11 receives no power.

For the first or low speed forward drive, the clutch 14 and the brake 17 are engaged, and a power train is thereby completed from the drive shaft 10 through the clutch 14, the intermediate shaft 12 and the planetary gear set 13, to the ring gear 19 and to the driven shaft 11 drivingly connected therewith. Since there are a pair of planet gears 21 between the sun gear 18 and the ring gear 19, and since the planet carrier 22 is held stationary by the brake 17, the ring gear 19 is rotated at a reduced speed, with respect to and in the same direction as the sun gear 18, and thus the planetary set will function to provide a torque multiplier in the power train.

The second or intermediate speed forward drive is completed by disengaging the brake 17, engaging the brake 16, and allowing the clutch 14 to remain engaged. In this case the drive is the same as in first speed except that the sun gear 23 instead of the carrier 22 is utilized as the reaction element of the gear set, and the ring gear 19 and thereby the driven shaft 11 are driven at a higher speed than in first gear but a reduced speed with respect to the sun gear 18.

The third or high speed forward drive is completed by disengaging the brake 16, engaging the clutch 15, and allowing the clutch 14 to remain engaged. In this instance the drive is from the drive shaft 10 through the clutches 14 and 15, the sun gears 18 and 23 and the remainder of the planetary gear set 13 including the ring gear 19, to the driven shaft 11. By engaging both of said clutches the planetary gear set is locked-up so that all the elements thereof rotate together as a unit, and a direct drive is established between the shafts 10 and 11.

The reverse drive is completed by engaging the clutch 15 and the brake 17. In such instance, the drive is from the drive shaft 10 through the clutch 15, the sun gear 23 and the remainder of the planetary gear set 13, to the driven shaft 11. The carrier 22 now functions as the reaction element of the planetary gear set, and, since there is only the single planet gear 20 between the driving sun gear 23 and the driven ring gear 19, said ring gear and thereby the driven shaft 11 are rotated in the reverse direction and at a reduced speed with respect to the drive shaft 10.

Control system

The control system, for the transmission illustrated herein, provides a source of fluid pressure that includes a front or drive shaft hydraulic pump indicated generally at 46, and a rear or driven shaft hydraulic pump shown generally at 47. While any suitable type of hydraulic pump may be used for this purpose the pumps diagrammed herein are of the well-known and conventional gear type. Pump 46 comprises, gears 48 and 49 which are in mesh while the gear 48 is also drivingly connected with the drive shaft 10, plus an inlet 50 and outlet 51. The pump 47 is similar thereto and includes a gear 52 that is drivingly connected with the driven shaft 11 and is in mesh with the gear 53, plus an inlet 54 and outlet 55.

The outlet or discharge 51 of pump 46 is connected by a fluid supply conduit 56 to a pressure regulator, indicated generally by the reference numeral 57, while the inlet or intake 50 of said pump is connected by a conduit 58 to an oil filtering device 59 disposed in an oil supply tank or sump 60 which may be constituted as a lower portion of the transmission housing. The rear pump 47 has its outlet or discharge 55 connected by a conduit 61 to the pressure regulator 57, while the inlet or intake 54 of said pump is connected by a conduit 62 that, in turn, connects with the conduit 58 leading into the sump 60.

Pressure regulator

The pressure regulator 57 may be of any suitable or conventional variety while the unit depicted herein is of a well-known type commonly utilized with automotive vehicle automatic transmissions. The purpose of a regulator of this character, of course, is to maintain the pressure in the hydraulic control system at a predetermined value in order to obtain proper functioning of the different hydraulically actuated friction engaging means operating in said system. This particular regulator comprises a casing or body member 63 which has a bore 64 therethrough and into one end of which is positioned a spool or piston member 65 that is adapted to abut a separate piston member 66 slidably disposed in the opposite end of said bore. The piston 66 is reacted upon by a concentrically arranged double spring 67 that is secured in place by suitable means such as the threaded plug member 67a. When the front pump 46 is operating fluid under pressure is delivered from the outlet 51 through the conduit 56 and the check valve 68 to the chamber 69 where a portion of the fluid reacts on the spool 65 while a small portion of the fluid passes through a bleed opening 70 in the end of the spool and into a chamber 71 adjoining the end thereof. Since the end of said chamber 71 is closed, by suitable means such as the plug-like bumper 72, the fluid under pressure therein acts against the end of the spool to aid in forcing it to the right against the reactive force of spring 67. If the pressure within chambers 69 and 71 should become so great as to cause the spool to slide far enough to the right to open the port 73 fluid will be delivered to the chamber 74, where a portion thereof will react against an opposite end portion of the spool 65 while a portion simultaneously dumps over into the sump 60 via the conduit 75 thereby reducing the pressure within chamber 69.

Lubrication regulator

A conduit 76 opening into chamber 69 is connected to a lubrication regulator valve, indicated generally by the numeral 77, which includes a conduit 78 opening thereinto that, in turn, is connected into the transmission for purposes of lubricating portions thereof. The valve 77 has a needle jet adjusting screw 79, and a piston 80 that is reacted upon by a spring 81, which latter piston is operative above predetermined pressures to discharge fluid via the conduit 82 into the sump 60. Thus when the pressure of the fluid delivered to the lubrication regulator valve 77 is greater than that prescribed for use in the transmission the piston 80, of said valve, becomes operative to dump the fluid back into the sump 60 rather than deliver it through the conduit 78 to the transmission.

Check valve

The chamber 69, of said pressure regulator, has an outlet or discharge opening 83 therein that connects via conduit 84 into a conduit 85 which has one end thereof connected to a one-way or check valve 86, which valve, in turn, is connected to the conduit 61 that connects into the discharge opening 55 of the rear pump 47. The check valve 86, which is generally conventional in construction, includes a piston member 87 that is reacted upon by a spring 88, and is arranged so that fluid may flow therethrough from the conduit 61 but is closed to the passage of fluid therethrough in a reverse direction from conduit 85. Thus said check valve serves to prevent fluid from the pressure regulator 57 being by-passed, via conduits 61, 62 and 58, back into the sump 60 when the rear pump 47 is not operating and maintaining fluid under pressure in conduit 61.

The conduit 85 has a branch conduit 89 leading from one end thereof which opens into a chamber 90, disposed proximate one end of the spool 65, wherein said fluid under pressure reacts against the spool 65 and thus functions to boost or aid the reactive force of the spring 67 in keeping the regulator from dumping its fluid back into the sump 60, as previously described, by way of opening 73 and conduit 75.

Reverse inhibitor

When the rear pump 47 is operating, such as when the driven shaft 11 is rotating, fluid under pressure is delivered by way of the outlet 55, and conduit 61, through the check valve 86 and into the conduit 85 where it joins with the fluid in chamber 69 in the pressure regulator 57. A reverse inhibitor, indicated generally at 91, may, if desired, be connected by a conduit 92 into the conduit line 61 which carries the discharge from the rear pump 47. Said inhibitor, which may be of any well-known or conventional variety, generally includes a piston 93 actuated by fluid pressure in conduit 92, a reactive spring 94, and a push rod or operating member 95 extending from one end thereof. The rod 95 may be adapted to interlock (by suitable conventional means not shown) the sliding mechanism of a selector valve, such as shown at 96, when the pressure within the conduit 92 has attained a predetermined value, thereby preventing the accidental positioning of said selector valve into a reverse drive position when the vehicle is moving in a forward direction. Since the details of this interlocking construction, which may be mechanical, electrical or hydraulic, are not essential to the specific operation of the present invention they have not been shown on the attached drawings, and it is felt a clear understanding of the invention may be obtained without including such details.

Foot treadle valve

The outlet or discharge from the pressure regulator 57 is connected by means of a conduit 97 to a foot treadle valve, shown generally at 98, which, in turn, is connected by a conduit 99 to the selector valve 96. Said foot treadle valve is intended for operation by the foot of the operator on a hingedly mounted exterior treadle portion 100. Pressing the treadle actuates suitable linkage mechanism, such as the push rod 101, which closes said valve, while release thereof opens the valve and allows the friction engaging devices controlled thereby to be energized. Said treadle valve device may be of any conventional construction which is actuatable to permit the gradual opening and closing thereof so as to effect gradual engagement and disengagement of the hydraulically actuated friction clutches 14 and 15 and brakes 16 and 17 and thus effectuate smoother operation of the transmission. Since devices of this character are so well known in the art it is believed unnecessary to further detail the construction thereof in the drawings or to elaborate on its specific features in the description.

*Selector valve*

The selector valve, indicated generally at 96, is believed to be unique and hence the more specific teachings of the invention are directed to the novel construction and arrangement of the elements and features thereof. The preferred form of this valve, as illustrated herein, comprises a body or casing 102 which may be fashioned for mounting onto the pressure regulator casing 63 by suitable means such as the bolts 103, but, it will be appreciated, it may be otherwise mounted or supported without deviating from the inventive concepts hereof. The body 102 is fashioned with a cylindrical bore, such as 104, which extends longitudinally therethrough, and a plurality of five axially spaced annularly extending recesses or grooves 105, 106, 107, 108 and 109 in the wall of said bore that are provided, respectively, with the outlets or ports 105a, 106a, 107a, 108a and 109a. The port 105a is connected to the clutch 14 by means of the conduit 110, the port 106a by conduit 99 to the foot treadle valve 98, the port 107a by conduit 111 to the clutch 15, the port 108a by conduit 112 to the brake 16 and the port 109a by conduit 113 to the brake 17. The bore 104 of said valve is further provided with ports or openings 114 and 115, located proximate opposite ends thereof, which are connected, respectively, by conduits 116 and 117 to the oil sump or reservoir 60. An end-plate or cover 118 may be suitably secured, by screw means 119, so as to close one end opening of said bore, while a perforated end-plate 120 may be secured, as by the screws 121, to cover the opposite end of said bore.

A spool or piston-like plunger, indicated generally by the reference numeral 122, is fashioned with a long cylindrical rod-like body 123 whose general diameter is dimensioned somewhat smaller than the interior diameter of the bore 104, while the axial length of said spool is only slightly greater than that of said bore. Spaced axially along the length of the body of said spool are six raised lands 124, 125, 126, 127, 128 and 129, respectively, which are radially dimensioned so as to permit a tight but slidable fit within the valve bore 104. The grooves formed axially between said lands and between the end land 124 and the end-plate 120 cooperate with the inner surface of the bore 104 to provide annularly extending fluid chambers which are designated, in consecutive order from left to right, 130, 131, 132, 133, 134 and 135. As best seen in Figure 8, the spool body 123 is provided with a longitudinal recess or bore 136 which extends axially inwardly from one end thereof a distance approximately half the length of the spool. A passage-forming insert member, shown at 137, is fashioned with a pair of axially extending and diametrically spaced recesses 138 and 139 which open outwardly and extend some distance therealong. The recess 139 extends from the end of the insert 137 inwardly, while the recess 138 is disposed intermediate the ends of said insert. The insert 137 is adapted for insertion into the recess 136, of said spool, and is positioned therewithin in a liquid-tight press fit relationship. After positioning of said insert within said spool the recesses 138 and 139 will be seen to cooperate with the inner wall surface of the bore-like recess 136 to provide longitudinally extending passageways designated, respectively, as 138a and 139a. Radially extending openings 140, 141 and 142 connect the passageway 138a with certain of the said annular chambers formed between the lands of the spool, while radially extending openings 143 and 144 also connect the passageway 139a with others of the aforesaid annular chambers. The spool 122 is adapted for insertion within the bore 104 and is intended to be slidably actuatable therewithin. One end of the spool body 123 is slidably mounted so as to project through an opening 120a in the end-plate 120 and to extend outwardly a short distance thereof. An annular groove 145 on the outwardly extending end of said spool is provided to receive a suitable mechanism, such as the lever 146, that may operate as part of a handle or actuating device for slidably manipulating said spool within the valve bore. Since any suitable or well-known linkage or equivalent mechanism may be employed to facilitate operation of the valve by the operator, without deviating from the inventive concepts of the valve, further specific details thereof are not being shown in the drawings.

*Operation*

In operation the position of the spool is selected to correspond with the drive for which the transmission is to be conditioned. Assuming first it is conditioned for neutral or non-driving condition, whereupon the position of the spool will be as indicated in Figure 1. In this case fluid under pressure will be delivered from the pressure regulator 57 through conduit 99 and the port 106a into the annular recess 106 and the adjacent annular chamber 131, and thence through opening 140 into the axial passage 138a in the spool. Since, in this position of the valve 96, the opening 141 from this latter passage opens only to the wall of the bore 104, while the only other opening in said passage opens to the closed annular chamber 135 in said spool, it will be appreciated that no fluid pressure will be applied to either of the clutches 14 and 15 or to the brakes 16 or 17; thus the drive is interrupted and no power will be transmitted through the transmission. While the spool of the valve is in this position any fluid that had previously been in clutch 14 will be free to drain or dump via conduit 110, port 105a, chamber 130, port 114 and conduit 116 into the sump 60, and fluid from brake 16 and clutch 15 will also be free to drain via chamber 132, opening 143, passageway 139a, port 115 and conduit 117 back into the sump 60, while brake 17, additionally, can dump its fluid via conduit 113, port 109a, opening 144, passage 139a, port 115 and conduit 117 into said sump.

Figure 2:
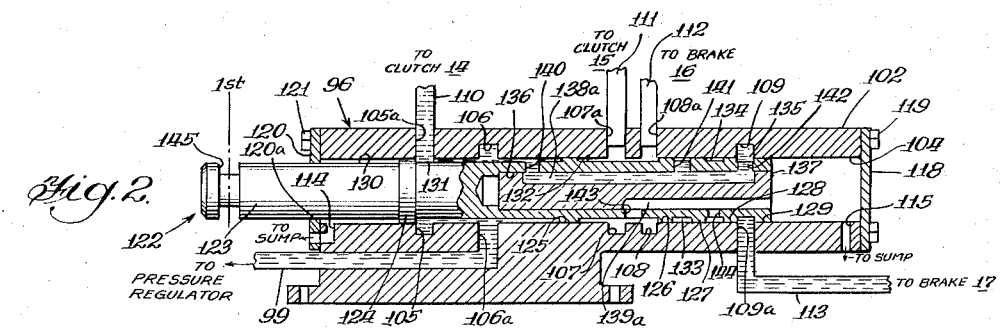
Figure 2 is a vertical sectional detail, in enlarged dimension, of the control valve shown in the position for completing first speed forward drive through the transmission.

To condition the system for first speed forward drive the spool 122, of the valve 96, is moved to the left one increment or step, to the position as best shown in Figure 2. In this instance fluid under pressure is delivered from the pressure regulator 57 through the port 106a into the annular chamber 131. From this chamber the fluid passes via recess 105 and port 105a into conduit 110, and thence into clutch 14 which is actuated, thus transmitting drive from shaft 10 to the intermediate shaft 12. At the same time fluid passes from chamber 131 through opening 140 into the axial passage 138a from which it is discharged via opening 142, chamber 135, the recess 109 and port 109a into the conduit 113 where it actuates and engages the brake 17. With clutch 14 and brake 17 engaged the drive is from the shaft 12 through the planetary gear set 13 and the ring gear 19 to the driven shaft 11. Since the planet carrier 22 is held stationary by the brake 17, and since there are a pair of planet gears 21 between the sun gear 18 and the ring gear 19, said ring gear is rotated at a reduced speed, with respect to and in the same direction as the sun gear 18. In this position of the selector valve the clutch 15 and brake 16 are still free to dump fluid via chamber 132, opening 143, passageway 139a, port 115 and conduit 117 into the sump 60.

Figure 3:
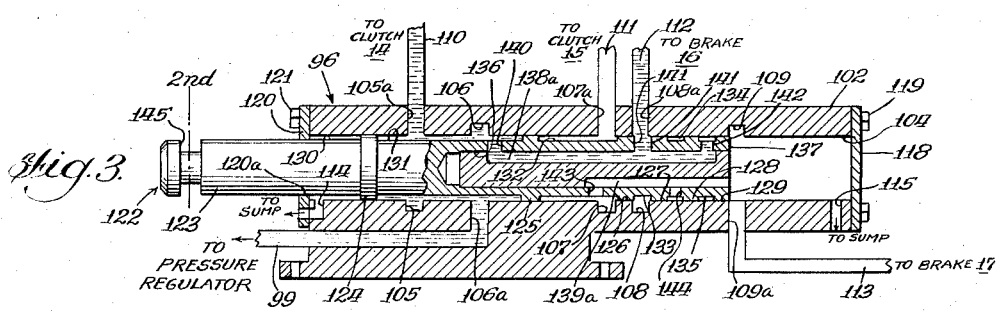
Figure 3 is similar to Figure 2, but is shown with the valve in position for second speed forward drive.

To condition the system for second or intermediate speed forward drive the spool 122, of the valve 96, is advanced one more increment or step to the left to the position shown in Figure 3. In this case the fluid under pressure from said pressure regulator is delivered through the port 106a into chamber 131, and from whence it is partially discharged via port 105a and conduit 110 into clutch 14 to continue the engagement thereof. Simultaneously a portion of the fluid is passed from said chamber via opening 140 into axial passageway 138a, and thence via opening 141, chamber 133, and port 108a into conduit 112. Since conduit 112 connects with brake 16 this brake will be energized and engaged. With clutch 14 and brake 16 engaged the drive is similar to that of first speed except that the sun gear 23 instead of the carrier 22 is utilized as the reaction element of the gear set, and thus the ring gear 19 and thereby the driven shaft 11 are driven at a higher but reduced speed, with respect to the sun gear 18. As thus positioned the valve is free to dump fluid from brake 17 via conduit 113, port 109a, bore 104, opening 115 and conduit 117 into the sump 60.

Figure 4:
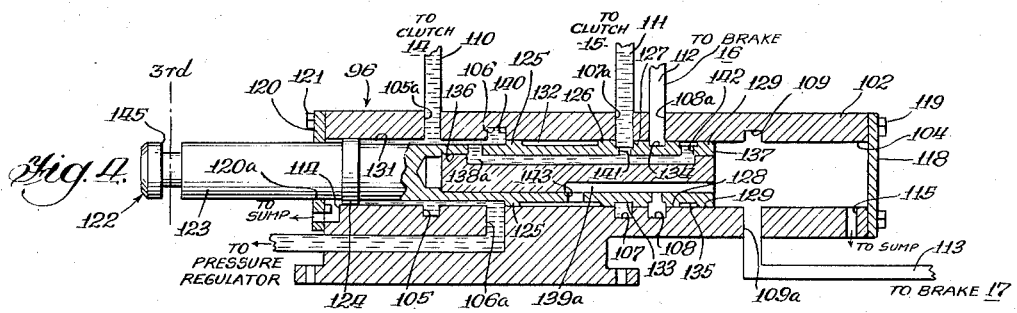
Figure 4 is similar to Figure 2, but is shown with the valve in position for third speed forward drive.

To condition the system for third or high speed forward drive the spool 122, of the valve 96, is advanced one more increment or step to the left to the position shown in Figure 4. In this instance fluid under pressure from the pressure regulator 57 is delivered through the port 106a into chamber 131, and from whence it is partially discharged through port 105a and conduit 110 into clutch 14 to continue the engagement thereof. Simultaneously a portion of the fluid is directed via opening 140, passageway 138a, opening 141, chamber 133 and port 107a into conduit 111. Since conduit 111 connects with clutch 15, this clutch will also be actuated and engaged. With clutches 14 and 15 engaged the drive is from shaft 10 through the engaged clutches 14 and 15 and the shaft 12 and carrier 33 to the sun gears 18 and 23, thence through the remainder of the planetary gear set 13, including the ring gear 19, to the driven shaft 11. With both of said clutches engaged the planetary gear set becomes locked-up and all elements rotate as a unit, thus a direct drive is established between shafts 10 and 11. As thus positioned the selector valve is free to permit fluid from brake 16 to dump via conduit 112, port 108a, chamber 134, opening 144, axial passageway 139a, bore 104, opening 115 and conduit 117 into sump 60.

Figure 5:
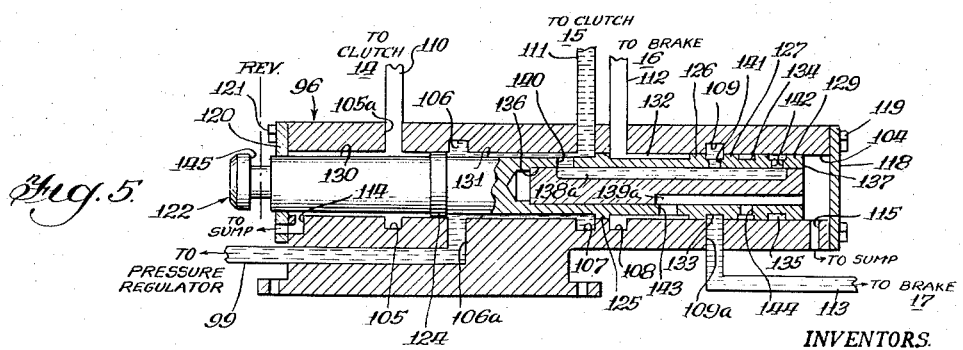
Figure 5 is similar to Figure 2, but is shown with the valve in position for completing reverse drive through the transmission.

To condition the system for reverse drive the spool 122, of the valve 96, is slidably moved three increments to the right to the position of neutral, then past neutral one additional increment or step to the right to the position as viewed in Figure 5. In this instance fluid under pressure from the pressure regulator 57 is delivered through the port 106a and recess 106 to the chamber 131, and from which it is partially discharged via port 107a and recess 107 into conduit 111. Since conduit 111 connects with clutch 15 this clutch will then be actuated and engaged. Simultaneously a portion of the fluid in chamber 131 will flow via opening 140 into passageway 138a, and thence via opening 141 into chamber 133 and through port 109a and recess 109 into conduit 113, which conduit being connected with brake 17 said brake will then be actuated and engaged. With clutch 15 and brake 17 both engaged the drive is from shaft 10 through the clutch 15 and carrier 33 to the sun gear 23, and thence through the remainder of the planetary gear set 13 to the drive shaft 11. Since the brake 17 is engaged the carrier 22 does not rotate but functions as the reaction element of the planetary, and, since there is only the single planet gear 20 between the driving sun gear 23 and the driven ring gear 19, said ring gear and thus the driven shaft 11 are rotated in a reverse direction and at a reduced speed with respect to the drive shaft 10. While in this position the selector valve is free to dump fluid from clutch 14 via conduit 110, port 105a, chamber 130, opening 114 and conduit 116 into sump 60, while brake 16 may also dump its fluid via conduit 112, port 108a, chamber 132, opening 143, passageway 139a, bore 104, opening 115 and conduit 117 into said sump.

From the above it should now be apparent that a novel selector valve adaptable for use with vehicle change-speed transmissions has been shown and described. It will be appreciated also that a valve operable in five different positions has been fashioned with minimum longitudinal and transverse dimensions and, furthermore, said valve is so uniquely arranged that equal increments of axial movement are required when shifting between consecutive positions, while, additionally, the direction of axial movement thereof is always in the direction of the operating sequence of the drives through the transmission, a factor which is particularly advantageous when utilized in tractor operations. It is to be understood, of course, that changes may be made in the construction without departing from the spirit of the invention or the scope thereof as defined in the appended claims.

What is claimed is:

1. In a transmission, the combination of a drive shaft, a driven shaft, means for providing low, intermediate and direct forward drives, a neutral drive, and a reverse drive between said shafts, a plurality of fluid pressure engaged friction engaging means for completing said drives, a source of fluid pressure, means including a plurality of fluid pressure transmitting lines for selectively connecting said fluid pressure source to said friction engaging means for completing said drives, a first of said engaging means being engaged for completing both said low forward drive and said reverse drive, a second of said engaging means being engaged for completing said low, intermediate and direct forward drives, a third of said engaging means being engaged for completing said direct forward drive and said reverse drive, and a fourth of said engaging means being engaged for completing said intermediate forward drive, said fluid pressure source including a selector valve having only one inlet port and only four distribution ports, each of which latter ports is connected directly to one of said friction engaging means, and a bleed means at each end of said valve, said valve having one position wherein fluid pressure is transmitted from said inlet port to the first and second of said engaging means for completing said low forward drive, said valve having another position wherein fluid pressure is transmitted from said inlet port to the second and fourth of said engaging means for completing said intermediate forward drive, said valve having a further position wherein fluid pressure is transmitted from said inlet port to the second and third of said engaging means for completing said direct forward drive, said valve having a still further position wherein fluid pressure is transmitted from said inlet port to the first and third of said engaging means for completing said reverse drive, and said valve having a yet still other position wherein no fluid pressure is transmitted between the inlet port and the distribution ports and neutral drive is established.

2. In a transmission, the combination of a drive shaft, a driven shaft, means for providing low, intermediate and direct forward drives, a neutral drive, and a reverse drive between said shafts, a plurality of fluid pressure engaged friction engaging means for completing said drives, a source of fluid pressure, means including a plurality of fluid pressure transmitting lines for selectively connecting said fluid pressure source to said friction engaging means for completing said drives, a first of said engaging means being engaged for completing both said low forward drive and said reverse drive, a second of said engaging means being engaged for completing said low, intermediate and direct forward drives, a third of said engaging means being engaged for completing said direct forward drive and said reverse drive, and a fourth of said engaging means being engaged for completing said intermediate forward drive, said fluid pressure source including a selector valve having only one inlet port and a maximum of four distribution ports, each of which latter ports is connected directly to one of said friction engaging means, and bleed means disposed at each end of said valve, said valve being fashioned with a body and a spool slidably operative within said body and positionable in a plurality of positions in certain of which fluid pressure is transmitted from said inlet port selectively to said distribution ports, said valve having a first position wherein the transmission of fluid pressure from the inlet port to each of the distribution ports is restricted for completing neutral drive, said valve having a second position wherein fluid pressure is transmitted from said inlet port to the first and second of said engaging means for completing said low forward drive, said valve having a third position wherein fluid pressure is transmitted from said inlet port to the second and fourth of said engaging means for completing said intermediate forward drive, said valve having a fourth position wherein fluid pressure is transmitted from said inlet port to the second and third of said engaging means for completing said direct forward drive, said valve having a fifth position wherein fluid pressure is transmitted from said inlet port to the first and third of said engaging means for completing said reverse drive.

3. In a transmission, the combination of a drive shaft, a driven shaft, means for providing low, intermediate and direct forward drives, a neutral drive, and a reverse drive between said shafts, a plurality of fluid pressure engaged friction engaging means for completing said drives, a source of fluid pressure, means including a plurality of fluid pressure transmitting lines for selectively connecting said fluid pressure source to said friction engaging means for completing said drives, a first of said engaging means being engaged for completing both said low forward drive and said reverse drive, a second of said engaging means being engaged for completing said low, intermediate and direct forward drives, a third of said engaging means being engaged for completing said direct forward drive and said reverse drive, and a fourth of said engaging means being engaged for completing said intermediate forward drive, said fluid pressure source including a selector valve for directing fluid pressure from said source selectively to one or more of said engaging means, said valve including a body having a bore therein and having a plurality of axially spaced and annularly extending recesses in said bore and a port associated with each recess and which recesses are adapted for communicating by way of said pressure transmitting lines with said engaging means and with said source, a spool slidably disposed within said bore and positionable in a plurality of positions therewithin and having a plurality of lands axially spaced therealong with grooves therebetween that define a first, a second, a third, a fourth and a fifth chamber, said spool being further fashioned to provide a first axially extending passage communicating wtih said first, third and fifth chambers, said valve having a first position wherein fluid pressure is transmitted from said source through said first chamber to said second engaging means and through said first chamber to said first axial passage to said fifth chamber to said first engaging means for completing said low forward drive, said valve having a second position wherein fluid pressure is transmitted from said source through said first chamber to said second engaging means and through said first chamber to said first axial passage to said third chamber to said fourth engaging means for completing said intermediate forward drive, said valve having a third position wherein fluid pressure is transmitted from said source through said first chamber to said second engaging means and through said first chamber and said first axial passage to said third chamber to said third engaging means for completing said direct forward drive, and said valve having a fourth position wherein fluid pressure is transmitted from said source through said first chamber to said third engaging means and through said first chamber and said first axial passage to said third chamber to said first engaging means for completing said reverse drive.

4. In a transmission, the combination of a drive shaft, a driven shaft, means for providing low, intermediate and direct forward drives, a neutral drive, and a reverse drive between said shafts, a plurality of fluid pressure engaged friction engaging means for completing said drives, a source of fluid pressure, means including a plurality of fluid pressure transmitting lines for selectively connecting said fluid pressure source to said friction engaging means for completing said drives, a first of said engaging means being engaged for completing both said low forward drive and said reverse drive, a second of said engaging means being engaged for completing said low, intermediate and direct forward drives, a third of said engaging means being engaged for completing said direct forward drive and said reverse drive, and a fourth of said engaging means being engaged for completing said intermediate forward drive, said fluid pressure source including a selector valve for directing fluid pressure from said source selectively to one or more of said engaging means, said valve including a body having a bore therein and having a plurality of axially spaced and annularly extending recesses in said bore and a port associated with each recess and which recesses are adapted for communicating by way of said pressure transmitting lines with said engaging means and with said source, a spool slidably disposed within said bore and positionable in a plurality of positions therewithin and having a plurality of lands axially spaced therealong with grooves therebetween that define a first, a second, a third, a fourth and a fifth chamber, said spool being further fashioned to provide a first axially extending passage communicating with said first, third and fifth chambers, and a second axially extending passage communicating with said second and fourth chambers, said valve additionally having a first means at one end and a second means at the other end thereof for bleeding fluid pressure therefrom, said valve having a first position wherein transmission of fluid from said source to each of said engaging means is restricted for completing said neutral drive and during which position of said valve fluid pressure is free to bleed from any of said engaging means, said valve having a second position wherein fluid pressure is transmitted from said source through said first chamber to said second engaging means and through said first chamber and said first axial passage to said fifth chamber to said first engaging means for completing said low forward drive and during which position of said valve fluid pressure is free to bleed from said third and fourth engaging means through said second chamber and said second axial passage to said second bleed means, said valve having a third position wherein fluid pressure is transmitted from said source through said first chamber to said second engaging means and through said first chamber to said first axial passage and said third chamber to said fourth engaging means for completing said intermediate forward drive and during which position of said valve fluid pressure is free to bleed from said third engaging means through said second chamber and said second axial passage to said second of the bleed means and from said first engaging means to the said second bleed means, said valve having a fourth position wherein fluid pressure is transmitted from said source through said first chamber to said second engaging means and through said first chamber and said first axial passage and said third chamber to said third engaging means for completing said direct forward drive and during which position of said valve fluid pressure is free to bleed from said fourth engaging means through said fourth chamber and said second axial passage to said second bleed means and from said first engaging means to the said second bleed means, and said valve having a fifth position wherein fluid pressure is transmitted from said source through said first chamber to said third engaging means and through said first chamber and said first axial passage and said third chamber to said first engaging means for completing said reverse drive and during which position of said valve fluid pressure is free to bleed from said fourth engaging means through said second chamber and said second axial passage to said second bleed means and from said second engaging means through the first of said bleed means.

5. In a control system for a plurality of hydraulically actuated units that are selectively operable for performing a preselected sequence of operations in a vehicle transmission to obtain different drives therethrough, a selector valve operable for directing fluid pressure from a source selectively to one or more of the hydraulic units, comprising: a valve body having a bore therein; said bore having a plurality of axially spaced annular recesses therein; said body having a plurality of ports communicating with said recesses and adapted for connection with the hydraulically actuated units and with a source of fluid pressure; individual fluid pressure dump means at each end of said bore; a spool slidably positioned within said bore; said spool being fashioned with a plurality of lands and grooves with the grooves disposed between said lands; said spool having a first axially extending passage communicating with a plurality of certain of said grooves, and a second axially extending passage communicating with a plurality of others of said grooves; and means for axially sliding said spool within said bore whereby said spool is positioned in any one of a plurality of five positions during four of which positions fluid pressure is directed to certain of the hydraulic units to effect the operation thereof while simultaneously fluid pressure is being dumped from others of the said units.

6. In a control system for a plurality of hydraulically actuated units that are selectively operable for performing a preselected sequence of operations in a vehicle transmission to obtain different drives therethrough, a selector valve operable for directing fluid pressure from a source selectively to one or more of the hydraulic units, comprising: a valve body having a bore therein; said bore having a plurality of axially spaced annular recesses therein; said body having a plurality of ports communicating with said recesses and adapted for connection with the hydraulically actuated units and with a source of fluid pressure; individual fluid pressure dump means at each end of said bore; a spool slidably positioned within said bore; said spool being fashioned with a plurality of lands and grooves with the grooves disposed between said lands; said spool having a first axially extending passage communicating with a plurality of certain of said grooves, and a second axially extending passage communicating with a plurality of others of said grooves; and means for axially sliding said spool within said bore whereby said spool is positioned in any one of five positions during four of which positions fluid pressure is directed simultaneously to two of the hydraulic units to effect the simultaneous operation thereof while coincident therewith fluid pressure is being dumped through said dumping means from the non-operated ones of the said hydraulic units.

7. In the hydraulic control system of a transmission mechanism employing first, second, third and fourth hydraulically actuated friction engaging means which are engageable and disengageable in a preselected sequence involving the engagement of at least two of said means for establishing each of the low, intermediate and direct forward drives and reverse drive through the transmission, a multi-position selecter valve, comprising: a body having a bore therewithin; said bore having a plurality of axially spaced annular recesses disposed therein and a port associated with each recess and adapted for fluid pressure communication with the four engaging means and with a source of fluid pressure; a spool member slidably disposed within said bore and positionable in a plurality of positions therein; said spool having a plurality of axially spaced lands with grooves therebetween defining first, second, third, fourth and fifth chambers; said spool having a first axially extending passage communicating with the first, third and fifth of said chambers, and a second axially extending passage communicating with the second and fourth of said chambers and with the bore of said valve; means for axially sliding said spool within said bore whereby the valve is conditioned for any one of a plurality of positions thereof; said valve having a first position wherein the spool is axially displaced outwardly from a neutral position and fluid pressure from a source is directed from one of said ports through said first chamber to another of said ports and to the second engaging means and through said first chamber to said first axial passage to said fifth chamber and through another of said ports to said first engaging means for conditioning the transmission for low forward drive; said valve having a second position wherein the spool is axially displaced outwardly from said first position and fluid pressure from a source is directed from one of said ports through said first chamber and another of said ports to the second engaging means and from said first chamber through said first axial passage to another of said ports to said fourth engaging means for conditioning the transmission for intermediate forward drive while fluid pressure is dumped from said first engaging means through another of said ports and the bore of said valve to a sump; said valve having a third position wherein the spool is axially displaced outwardly from said second position and fluid pressure from a source is directed from one of said ports to said first chamber and through another of said ports to said second engaging means and from said first chamber through said first axial passage to said third chamber and through another of said ports to said third engaging means for conditioning the transmission for direct forward drive while fluid pressure is dumped from said fourth engaging means via said second axial passage and the bore of said valve to a sump; said valve having a fourth position wherein the spool is axially displaced inwardly from a neutral position and fluid pressure from a source is directed from one of said ports to said first chamber and through another of said ports to said third engaging means and from said first chamber through said first axial passage to said third chamber and through another of said ports to said first engaging means for conditioning the transmission for reverse drive while fluid pressure is dumped from said second engaging means via another of said ports and the bore of said valve to a sump.

8. In the hydraulic control system of a vehicle change-speed transmission mechanism employing first, second, third and fourth hydraulically actuated friction engaging means which are engageable and disengageable in a preselected sequence involving the engagement of at least a pair of said means for establishing each of the low, intermediate and direct forward drives and reverse drive through the transmission and the disengagement of all four of said means for establishing neutral drive through the transmission, a multi-position selector valve, comprising: a body having a cylindrical bore therewithin; said bore having a plurality of axially spaced annularly extending recesses disposed therein and a port associated with each recess and having said ports adapted for fluid pressure communication with the four engaging means and with a source of fluid pressure; separate fluid pressure dump means associated one each with each end of the bore and adapted for communication with a fluid sump; a spool member slidably disposed within said bore and positionable in a plurality of positions therein; said spool having a plurality of axially spaced lands and grooves therebetween defining first, second, third, fourth and fifth annularly extending chambers; said spool having a first axially extending passage communicating with the first, third and fifth of said chambers, and a second axially extending passage communicating with the second and fourth of said chambers and with the bore of said valve; means for axially sliding said spool within said bore whereby the valve is conditioned for any one of a plurality of positions thereof; said valve having a first position wherein the spool is positioned so as to seal off and restrict the transmission of fluid pressure from a source to all of the said engaging means for conditioning the transmission for neutral drive; said valve having a second position wherein the spool is axially displaced outwardly from said first position and fluid pressure from a source is directed from one of said ports through said first chamber to another of said ports and to the second engaging means and through said first chamber to said first axial passage to said fifth chamber and through another of said ports to said first engaging means for conditioning the transmission for low forward drive; said valve having a third position wherein the spool is axially displaced outwardly from said second position and fluid pressure from a source is directed from one of said ports through said first chamber and another of said ports to the second engaging means and from said first chamber through said first axial passage to another of said ports to said fourth engaging means for conditioning the transmission for intermediate forward drive while fluid pressure is dumped from said first engaging means through another of said ports and the bore of said valve and one of said dump means to a sump; said valve having a fourth position wherein the spool is axially displaced outwardly from said third position and fluid pressure from a source is directed from one of said ports to said first chamber and through another of said ports to said second engaging means and from said first chamber through said first axial passage to said third chamber and through another of said ports to said third engaging means for conditioning the transmission for direct forward drive while fluid pressure is dumped from said fourth engaging means by way of the said second axial passage and the bore of said valve and the one of said dump means to a sump; said valve having a fifth position wherein the spool is axially displaced inwardly from said neutral position and fluid pressure from a source is directed from one of said ports to said first chamber and through another of said ports to said third engaging means and from said first chamber through said first axial passage to said third chamber and through another of said ports to said first engaging means for conditioning the transmission for reverse drive while fluid pressure is dumped from said second engaging means by way of another of said ports and the bore of said valve and the other of said dump means to a sump.

9. A selector valve operable for directing fluid pressure from a source selectively to four hydraulically actuated units which are operable in pairs for performing a preselected sequence of operations in a transmission to obtain different drives therethrough, comprising: a body having a bore therethrough; said bore having a maximum of five axially spaced annular recesses therein with the first of said recesses disposed proximate one end of said bore and with the second, third, fourth and fifth of said recesses disposed in consecutive order between said first recess, and the opposite end of said bore; said first, third, fourth and fifth recesses being adapted for fluid pressure communication with the four hydraulically actuated units, and the second of said recesses being adapted for communication with a source of fluid pressure; a spool member slidably disposed within said bore and adapted for axial movement into a plurality of at least five operating positions therewithin; said spool having a maximum of six axially spaced lands with five grooves therebetween, and having the first of said grooves disposed proximate one end thereof and with the second, third, fourth and fifth of said grooves disposed in consecutive order between said first groove and the opposite end of said spool; said spool being further positioned within said bore so that the first said groove thereof is disposed closest to the first of said recesses of said bore; said spool having a first axially extending passage communicating with the first, third and fifth of said grooves, and a second axially extending passage communicating with the second and fourth of said grooves and with an end portion of said bore; means for axially sliding said spool within said bore whereby said valve is conditioned selectively for each one of five operating positions.

10. A hydraulic selector valve operable for selectively directing fluid pressure from a source to four hydraulically actuated units which are operable in pairs for performing a preselected sequence of operations in a transmission mechanism in order to complete different drives therethrough, comprising: a body having a longitudinally extending bore therethrough; said bore having a maximum of five axially spaced and radially inwardly opening annular recesses with the first of said recesses disposed proximate one end of said bore, and with the second, third, fourth and fifth of said recesses disposed in consecutive order between said first recess and the opposite end of said bore; said first, third, fourth and fifth recesses being adapted for fluid pressure communication with the four hydraulically actuated units, and the second of said recesses being adapted for communication with a source of fluid pressure; a spool member slidably disposed within said bore and adapted for axial movement into a plurality of five positions therewithin; said spool having a maximum of six axially spaced lands with five radially outwardly opening grooves therebetween, and having the first of said grooves disposed proximate one end thereof with the second, third, fourth and fifth of said grooves disposed in consecutive order between said first groove and the opposite end of said spool; said spool being further positioned within said bore so that the first said groove thereof is disposed closest to the first of said recesses of said bore; said spool being fashioned with an axially extending recess that opens in the end thereof farthest from the said first groove, and having passages connecting said latter recess with all of said grooves; an insert member positioned in said axial recess; said insert having a first portion thereof cut-away to provide an axially extending passage interconnecting the passages that connect with the said first, third and fifth grooves, and a second cut-away portion that provides an axially extending passage interconnecting the passages that connect with the said second and fourth grooves and opening at one end thereof into the said bore; and means for axially displacing said spool within said bore whereby said valve is conditioned selectively for each of a plurality of five operating positions.

11. A hydraulic selector valve operable for selectively directing fluid pressure from a source to four hydraulically actuated units which are operable in pairs for performing a preselected sequence of operations in a transmission mechanism in order to complete different drives therethrough, comprising: a body having a longitudinally extending bore therethrough; said bore having a maximum of five axially spaced and radially inwardly opening annular recesses with the first of said recesses disposed proximate one end of said bore, and with the second, third, fourth and fifth of said recesses disposed in consecutive order between said first recess and the opposite end of said bore; said first, third, fourth and fifth recesses being adapted for fluid pressure communication with the four hydraulically actuated units, and the second of said recesses being adapted for communication with a source of fluid pressure; a spool member slidably disposed within said bore and adapted for axial movement into a plurality of five positions therewithin; said spool having a maximum of six axially spaced lands with five radially outwardly opening grooves therebetween, and having the first of said grooves disposed proximate one end thereof with the second, third, fourth and fifth of said grooves disposed in consecutive order between said first groove and the opposite end of said spool; said spool being further positioned within said bore so that the first said groove thereof is disposed closest to the first of said recesses of said bore; said spool being fashioned with an axially extending recess that opens in the end thereof farthest from the said first groove; an insert member positioned in a press fit fluid-tight relationship within said axially extending recess of said spool; said insert having a first axially extending recess therein disposed intermediate said first and sixth lands and opening into the axially extending recess of said spool; said spool having radially extending passages connecting said first axially extending recess with the first, third and fifth grooves thereof; said insert having a second axially extending recess therein disposed intermediate said second land and the end of said insert adjacent said sixth land and opening into the axially extending recess of said spool and into the bore of said valve; said spool further having radially extending passages connecting said second axially extending recess with the second and fourth grooves thereof; and means for axially displacing said spool within said bore whereby said valve is conditioned selectively for each of a plurality of five operating positions.

12. A hydraulic selector valve operable for selectively directing fluid pressure from a source to four hydraulically actuated units which are operable in pairs for performing a preselected sequence of operations in a transmission mechanism in order to complete different drives therethrough, comprising: a body having a longitudinally extending bore therethrough; said bore having a maximum of five axially spaced and radially inwardly opening annular recesses with the first of said recesses disposed proximate one end of said bore, and with the second, third, fourth and fifth of said recesses disposed in consecutive order between said first recess and the opposite end of said bore; said first, third, fourth and fifth recesses being adapted for fluid pressure communication with the four hydraulically actuated units, and the second of said recesses being adapted for communication with a source of fluid pressure; a spool member slidably disposed within said bore and adapted for axial movement into a plurality of five positions therewithin; said spool having a maximum of six axially spaced lands with five radially outwardly opening grooves therebetween, and having the first of said grooves disposed proximate one end thereof with the second, third, fourth and fifth of said grooves disposed in consecutive order between said first groove and the opposite end of said spool; said spool being further positioned within said bore so that the first said groove thereof is disposed closest to the first of said recesses of said bore; said spool having a separately fashioned insert member disposed therewithin and extending axially thereof; said insert having first and second cut-away portions which extend axially thereof and are disposed in parallel relationship one on either side of the longitudinal axes of said insert; said first and second cut-away portions cooperating with the said spool to provide first and second axially extending passages therein; said spool being further provided with a plurality of radially extending passages which are disposed so as to connect said first axially extending passage with said first, third and fifth grooves and to connect said second axially extending passage with said second and fourth grooves; said second axially extending passage being further disposed to extend to and open into an open end of said insert; and means for axially displacing said spool within said bore whereby said valve is conditioned selectively for each of a plurality of five operating positions.

References Cited in the file of this patent

UNITED STATES PATENTS

| | | |
|---|---|---|
| 2,223,716 | Bojesen | Dec. 3, 1940 |
| 2,605,652 | Kelbel | Aug. 5, 1952 |
| 2,679,768 | Baule | June 1, 1954 |
| 2,747,612 | Lee | May 29, 1956 |
| 2,765,808 | Tydeman | Oct. 9, 1956 |